(12) United States Patent
Walker

(10) Patent No.: US 8,061,088 B2
(45) Date of Patent: Nov. 22, 2011

(54) TRUSS AND RAFTER TIDE GUIDE

(76) Inventor: Michael Walker, Auburn, NY (US)

(*) Notice: Subject to any disclaimer, the term of this patent is extended or adjusted under 35 U.S.C. 154(b) by 2 days.

(21) Appl. No.: 11/737,216

(22) Filed: Apr. 19, 2007

(65) Prior Publication Data

US 2008/0016791 A1    Jan. 24, 2008

Related U.S. Application Data

(60) Provisional application No. 60/795,016, filed on Apr. 25, 2006.

(51) Int. Cl.
*E04B 7/04* (2006.01)

(52) U.S. Cl. ............ 52/92.2; 52/702; 52/127.2; 52/696; 403/403

(58) Field of Classification Search .............. 52/92.2, 52/92.1, 92.3, 93.1, 93.2, 127.2, 696, 697, 52/698, 712, 715, 650.2, 695, 290, 300, 289, 52/699, 702, 703, 704, 710, 231, 146, 167.3, 52/223.1; 403/400, 403, 346, 232.1, 231, 403/219, 170; 248/300

See application file for complete search history.

(56) References Cited

U.S. PATENT DOCUMENTS

| | | | | |
|---|---|---|---|---|
| 828,488 A * | 8/1906 | Lanz | ............................ | 29/897.3 |
| 1,848,085 A * | 3/1932 | Eisenschmidt | ............... | 403/187 |
| 1,945,925 A * | 2/1934 | Stiefel | ................................ | 403/2 |
| 2,302,194 A * | 11/1942 | Dayton | ........................ | 403/217 |
| 2,369,687 A * | 2/1945 | Ralston | ......................... | 403/403 |
| 2,413,362 A * | 12/1946 | Maxwell et al. | .............. | 403/403 |
| 2,706,521 A * | 4/1955 | Nelson | ............................. | 160/38 |
| 2,911,022 A * | 11/1959 | Brown | ........................... | 269/40 |
| 3,256,030 A * | 6/1966 | Banse | ........................... | 403/400 |
| 3,537,221 A * | 11/1970 | Helfman et al. | ................ | 52/289 |
| 3,967,908 A * | 7/1976 | Snow et al. | .................... | 403/219 |
| 3,972,169 A * | 8/1976 | Sheppard, Jr. | .................. | 52/702 |
| 4,005,942 A * | 2/1977 | Gilb | .............................. | 403/189 |
| 4,080,771 A | 3/1978 | Weller | | |
| 4,410,294 A * | 10/1983 | Gilb et al. | ....................... | 403/27 |
| 4,411,548 A * | 10/1983 | Tschan | ....................... | 403/232.1 |
| 4,498,801 A * | 2/1985 | Gilb | .......................... | 403/232.1 |
| 4,560,301 A * | 12/1985 | Gilb | .......................... | 403/232.1 |
| 4,572,695 A * | 2/1986 | Gilb | .......................... | 403/232.1 |
| 4,596,101 A * | 6/1986 | Brinker | ........................... | 52/317 |
| 4,669,235 A | 6/1987 | Reinen | | |
| 4,932,173 A * | 6/1990 | Commins | ...................... | 52/92.2 |
| 4,965,980 A * | 10/1990 | Leavens | ........................... | 52/712 |
| 5,230,198 A * | 7/1993 | Callies | ............................ | 52/702 |
| 5,335,469 A * | 8/1994 | Stuart | ........................... | 52/655.1 |
| 5,380,115 A * | 1/1995 | Colonias | ........................ | 403/170 |
| 5,625,995 A * | 5/1997 | Martin | ............................. | 52/715 |
| 5,857,295 A * | 1/1999 | Mikawa | ........................ | 52/92.2 |
| 5,870,874 A | 2/1999 | Brothers | | |
| 6,209,268 B1 * | 4/2001 | Schmidt | ......................... | 52/92.1 |
| 6,295,781 B1 * | 10/2001 | Thompson | ....................... | 52/712 |
| 6,332,299 B1 * | 12/2001 | Stewart, III | .................... | 52/696 |
| 6,412,233 B1 | 7/2002 | Jones | | |

(Continued)

*Primary Examiner* — Eileen D Lillis
*Assistant Examiner* — James Ference
(74) *Attorney, Agent, or Firm* — Thomas R. FitzGerald, Esq.; Hiscock & Barclay, LLP

(57) ABSTRACT

The invention provides tie guides for affixing trusses and rafters and other cross members to the supporting walls of a building. The tie guide includes a longitudinal base plate with a horizontal component and a vertical component. Fixing members are transverse to the base plate, and are supported by triangular flanges extending in the longitudinal direction.

20 Claims, 3 Drawing Sheets

U.S. PATENT DOCUMENTS

| | | | |
|---|---|---|---|
| 6,418,695 B1 * | 7/2002 | Daudet et al. | 52/677 |
| 6,463,711 B1 * | 10/2002 | Callies | 52/702 |
| 6,662,517 B1 * | 12/2003 | Thompson | 52/714 |
| 6,672,014 B1 | 1/2004 | Jones | |
| D492,889 S * | 7/2004 | Craine | D8/354 |
| 6,837,019 B2 * | 1/2005 | Collie | 52/712 |
| 6,877,291 B2 * | 4/2005 | Shamroukh et al. | 52/702 |
| 7,310,914 B1 * | 12/2007 | Moore | 52/92.2 |
| 7,398,620 B1 * | 7/2008 | Jones | 52/92.2 |
| 2002/0112439 A1 * | 8/2002 | Rosas | 52/712 |

* cited by examiner

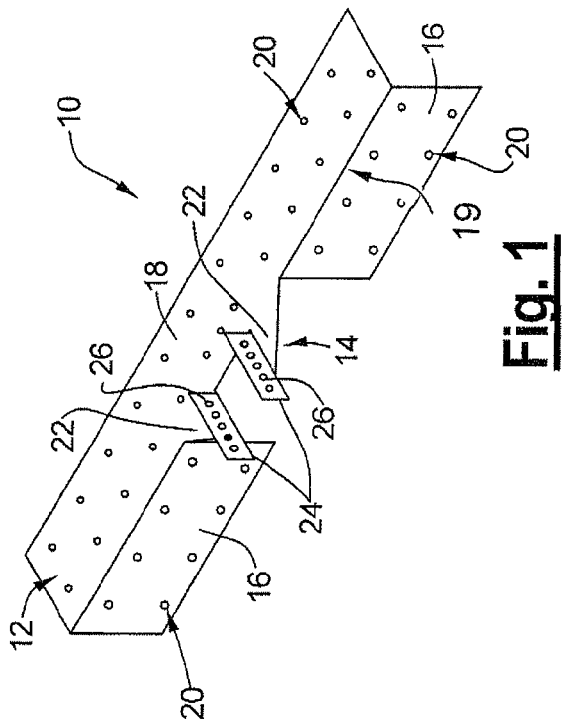
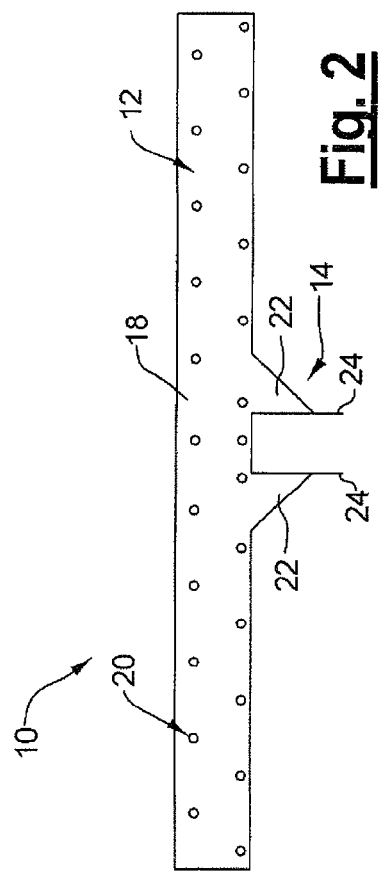
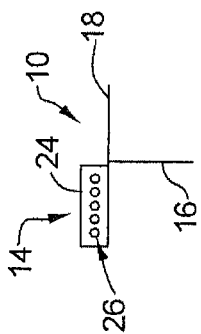
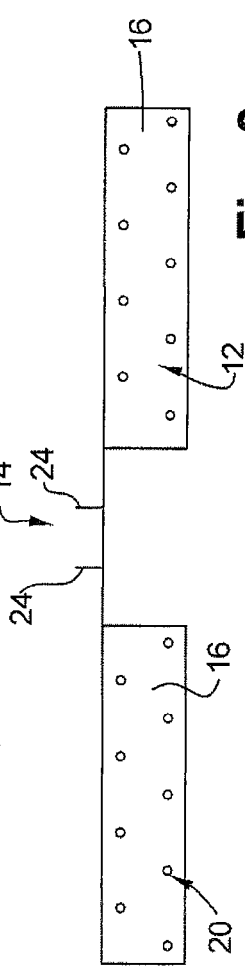

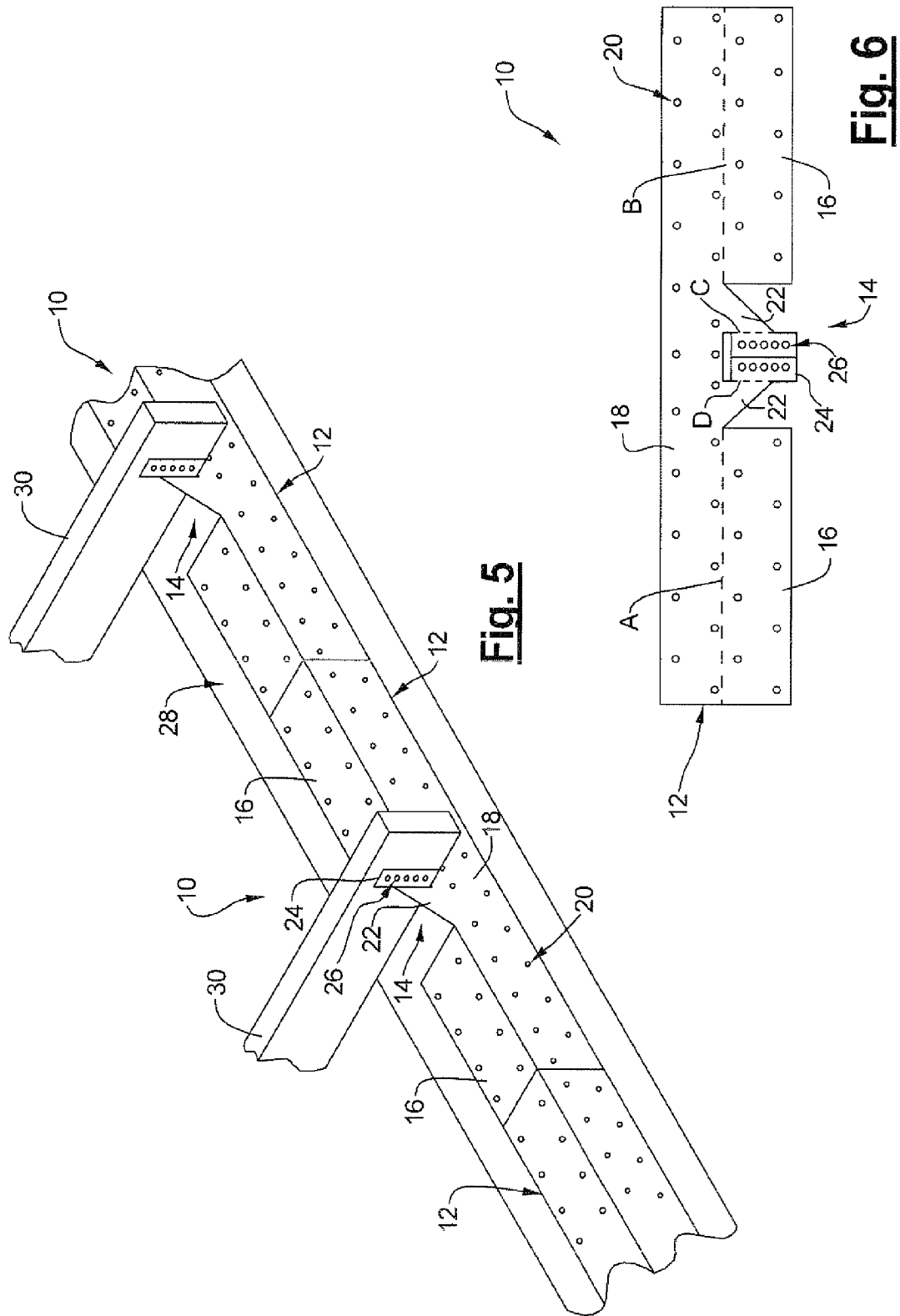

TRUSS AND RAFTER TIDE GUIDE

CROSS-REFERENCE TO RELATED APPLICATIONS

This application claims priority from U.S. Provisional Patent Application Ser. No. 60/795,016, filed Apr. 25, 2006, which is herein incorporated by reference.

FIELD OF THE INVENTION

This invention relates tie guides for affixing trusses and rafters to the supporting walls of a building.

BACKGROUND OF THE INVENTION

In building a structure such as a house or a shed, it is important to ensure the proper spacing of joists, trusses, rafters, or beams when affixing them to the support walls. This requires careful measurement during construction such that the centers of the cross members are spaced according to the specified dimension. For example the spacing of the cross members is generally 12, 16, or 24 inches, though other distances may be specified. Even small errors in the measurement tend to accumulate and cause large problems in the construction. Also, the cross member may move when attaching it to the support wall. These errors may cause severe alignment issues along the cross member from one support wall to the next. Brackets may be used to hold the cross member in position; however, such brackets provide for few fasteners for supporting the member.

There exists a number of U.S. patents directed to truss guides including U.S. Pat. No. 6,412,233 issued to Jones on Jul. 2, 2002. Jones teaches a system for positioning and securing structural members to supporting walls of a building. The system includes at least a pair of mounting devices respectively mounted to a pair of longitudinally extended laterally spaced building supporting walls. Each mounting device includes a base plate having a plurality of pairs of fixing members disposed in spaced longitudinal relationship. A space between each of the pairs of fixing members is provided for receiving the structural member therein. Each mounting device also includes a pair of second fixing members disposed adjacent opposing ends of the base plate. Each of the fixing members are formed by vertically directed C-shaped channel members. Each channel member has a central web portion bounded on two vertically directed sides by a pair of flanges expending in a longitudinal direction. The flanges provide lateral stability and torsion resistance to the support of corresponding structural members.

Jones's fixing members include flanges; however, they add to the complexity of the guide and require additional steps in manufacturing. Further, Jones's mounting devices are affixed to the top of the support wall only, with no way to attach to the vertical portion of the support wall. Further, Jones provides for few fasteners for affixing the guide to the support wall and the cross member.

U.S. Pat. No. 4,080,771 issued to Weller on Mar. 28, 1978 teaches an elongated member made of substantially flat metal stock that is adapted to fix the spacing of structural members associated with a building structure. To this end, the member is provided with a plurality of pairs of laterally-spaced metal flanges located at modular distances therealong, the structural member of a building or truss being secured between successive pairs of flanges (fixing members).

Weller teaches a truss guide with fixing members without flanges for support of the fixing members. Further, Weller's truss guide is mounted to the top of the support structure with no way to attach to the vertical portion of the support wall. Further, Weller provides for few fasteners for affixing the guide to the support wall and the cross member.

Therefore, a truss/rafter tie guide that provides for the simple placement of cross members on a support wall and has support on the horizontal surface of the support wall as well as the vertical surface of the wall is desired. Further, a guide that is simple to manufacture and ship is desired. Even further, a guide that provides for a large number of fasteners for added strength is desired.

SUMMARY OF THE INVENTION

The invention comprises, in one form thereof, a truss/rafter tie guide having a longitudinal base plate with a horizontal component and a vertical component. Fixing members are transverse to the base plate, and are supported by triangular flanges extending in the longitudinal direction.

More particularly, the invention includes a tie guide comprising a support plate with an elongate vertical flange that is fixable to a vertical support wall portion and at least one horizontal flange fixable to a horizontal portion of the support wall; a pair of slanted flanges extending from the vertical flange; and a fixing member extending from each of the slanted flanges and being fixable to a cross member.

In another form, the invention includes a method for using a tie guide for trusses and rafters. The method comprises the steps of providing a tie guide having a support plate with an elongate vertical flange and at least one horizontal flange, a pair of slanted flanges extending from the vertical flange, and a fixing member extending from each of the slanted flanges; fastening the horizontal flange to a horizontal portion of the support wall and the elongate vertical flange to a vertical support wall portion; lining up a cross member between the fixing members; and fastening the fixing members to the cross member.

An advantage of the present invention is that the guide provides for the simple placement of cross members on a support wall and has support on the horizontal surface of the support wall as well as the vertical surface of the wall. Further, the guide provides for a large number of fasteners to affix the plate and the fixing members to the support wall and cross member, respectively, for greatly increased strength. Even further, the guide is simple to manufacture and ship.

BRIEF DESCRIPTION OF THE DRAWINGS

The present invention is disclosed with reference to the accompanying drawings, wherein:

FIG. 1 is an isometric view of the truss guide according to the present invention;

FIG. 2 is an elevation view of the truss guide of FIG. 1;

FIG. 3 is a plan view of the truss guide of FIG. 1;

FIG. 4 is a plan view of the truss guide of FIG. 1;

FIG. 5 is an isometric view of the truss guide of FIG. 1 in use;

FIG. 6 is a plan view of the preformed truss guide; and

Corresponding reference characters indicate corresponding parts throughout the several views. The examples set out herein illustrate several embodiments of the invention but should not be construed as limiting the scope of the invention in any manner.

DETAILED DESCRIPTION

Figure 7:
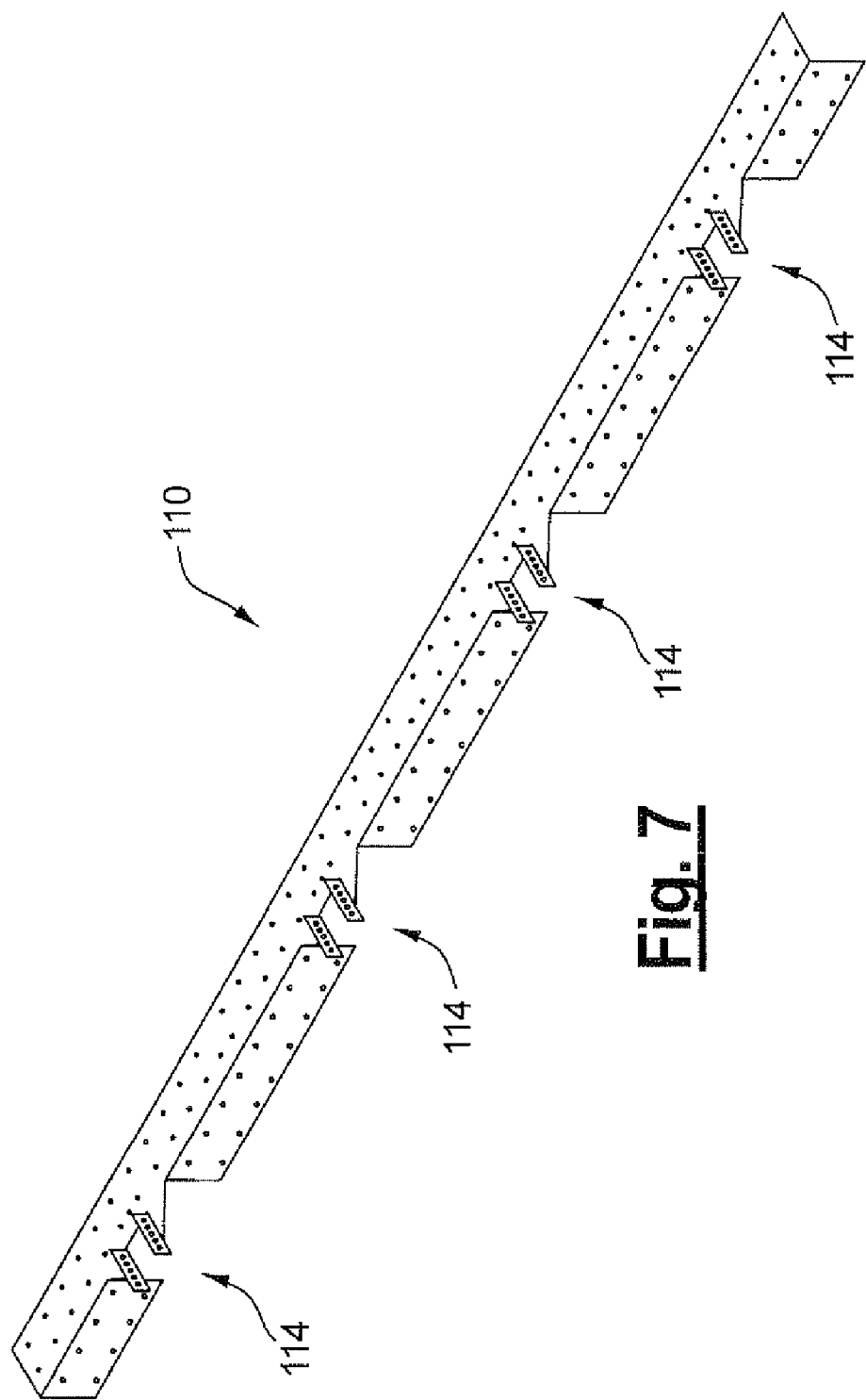
FIG. 7 is an isometric view of the truss guide of a second embodiment.

Referring to FIGS. 1-4, there is shown the truss/rafter guide of the present invention. The guide 10 is made of sheet metal or other suitable material and includes a support plate 12 and a bracket 14. The support plate 12 includes horizontal flanges 16 and an elongate vertical flange 18 joined together along a common longitudinal edge 19. A number of spaced-apart holes 20 in the support plate 12 are each sized for a clearance fit with a fastener, such as a nail or a screw, for securing the plate 12 to the top of a support wall.

The bracket 14 includes a pair of sloped flanges 22 extending vertically from the vertical flange 18. The flanges 22 each support a substantially planar fixing member 24 that includes a plurality of holes 26, each sized for a clearance fit with a fastener, such as a nail or a screw, for securing the fixing members 24 to a cross member.

The guide 10 is affixed to a support wall and cross member as shown in FIG. 5. The support plate 12 is placed over the edge of the top of the support wall 28 and the vertical flange 18 is nailed or otherwise affixed to the vertical portion of the wall 28 and the horizontal flange 16 is nailed or otherwise affixed to the horizontal portion of the wall 28. A cross member of a truss, joist, beam, or rafter is placed between the fixing members 24 and nailed or otherwise affixed to the fixing members 24 through the holes 26.

The length of the plate 12 is configured to allow placement of the cross members 30 on the wall 28 at a predetermined distance without the need for measurement. For example, the plate 12 may be 24-in long for an application that requires the cross members 30 to be placed on 24-in centers. In another example, the plate 12 is 16-in long for placement of the cross member 30 on 16-in centers.

In a particular embodiment, the guide 10 is formed from a single piece of sheet metal. The sheet shown in FIG. 6 has been stamped or machined to remove portions of the sheet between the horizontal flanges 16 and the flanges 22 and between the vertical plate 18 and the fixing members 24. A line is also cut between the fixing members 24 to separate the same. The holes 20 and 24 are formed by the punch process or drilled. A press brake then bends the horizontal flanges 16 along lines A and B in a first direction. The press brake also bends the fixing members 24 along lines C and D in a second direction that is opposite to the first direction. In another particular embodiment, the guide 10 is formed in a punch press with a single die set that forms all the features of the guide 10. Particularly, the punch press includes a die set that punches the holes 20 and 26, removes the portions between the horizontal flanges 16 and the flanges 22 and between the vertical plate 18 and the fixing members 24, and bends the horizontal flanges 16 and the fixing members 24 into position in a single step.

In use, the first guide 10 is affixed to the top of the support wall 28 such that it is centered about the location for the first cross member 30. Each additional guide 10 is affixed to the wall 28 in abutting engagement with the previously applied guide until there is a guide 10 for each of the cross members 30 in the application. The cross members are now placed between each pair of fixing members 24 and affixed thereto. There is no need to continually measure the distance between the cross members to ensure the proper spacing; the guides, and thus the cross members, are spaced by the length of the plate 12.

In an alternative embodiment, the guide 110 includes a plurality of brackets 114 as shown in FIG. 7. In an example, the guide 110 is 8-ft long with four brackets 114 for four cross members on 24-in centers. Additional embodiments having different lengths and different numbers of brackets may be contemplated.

It should be particularly noted that the guide provides for a large number of fasteners to affix the plate 12 and the fixing members 24 to the support wall 28 and cross member 30, respectively, for greatly increased strength. Further, the guide is simple to manufacture and ship—especially the guide 10 of the first embodiment, which may be formed using a single stamp.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A tie guide for trusses and rafters, the tie guide comprising:

a support plate with an elongate vertical flange having a planar body disposed entirely in a first plane and fixable to an exterior portion of a vertical support wall and a pair of spaced apart horizontal flanges each having a planar body disposed entirely in a second plane oriented transverse to the first plane and fixable to a horizontal portion of the support wall, the vertical and horizontal flanges joined together along a common longitudinal edge;

said vertical flange further comprising a pair of opposing slanted flanges disposed between the spaced apart horizontal flanges, each slanted flange of said pair having a third planar body disposed entirely in the same first plane as the first planar body of the vertical flange and extending from the common longitudinal edge, each slanted flange defined by one edge normal to the common longitudinal edge and one edge transverse to the common longitudinal edge, said normal edges disposed opposite each other and partially defining an opening for receiving a cross member and said transverse edges extending between a normal edge and the common longitudinal edge; and fixing members disposed entirely in a plane substantially perpendicular to the vertical and horizontal flanges, the fixing members facing each other, extending from each of the normal edges of the slanted flanges to about the common longitudinal edge to further define the opening for a cross member and said fixing members being fixable to opposite sides of a cross member passing through the opening defined by the normal edges and the fixing members of the slanted flanges.

2. The tie guide for trusses and rafters of claim 1, wherein the length of the support plate is substantially equal to a specified spacing between two cross members.

3. The tie guide for trusses and rafters of claim 1, the elongate vertical flange extending substantially the entire length of the support plate.

4. The tie guide for trusses and rafters of claim 1, the elongate vertical flange and the pair of horizontal flanges defining a plurality of holes, each sized to fit a fastener.

5. The tie guide for trusses and rafters of claim 1, the support plate, the slanted flanges, and the fixing members being formed from a unitary sheet.

6. The tie guide for trusses and rafters of claim 5, the support plate, the slanted flanges, and the fixing members being formed from the unitary sheet by a single stamp.

7. The tie guide for trusses and rafters of claim 5, wherein the tie guide is configured to guide a plurality of trusses or rafters with one or more additional pairs of slanted flanges extending from the vertical flange, each additional slanted flange having a fixing member extending therefrom.

8. The tie guide for trusses and rafters of claim 1, the slanted flanges having a substantially triangular shape.

9. The tie guide for trusses and rafters of claim 1, the fixing members defining a plurality of holes, each sized to fit a fastener.

10. The tie guide for trusses and rafters of claim 1 wherein the edges of the slanted flanges transverse to the common longitudinal edge are disposed along intersecting lines.

11. The tie guide for trusses and rafters of claim 1 wherein the edges of the slanted flanges transverse to the common longitudinal edge are not substantially parallel.

12. The tie guide for trusses and rafters of claim 1 wherein the edges of the slanted flanges transverse to the common longitudinal edge each intersect the common longitudinal edge at equal and opposite angles.

13. The tie guide for trusses and rafters of claim 1 wherein each of the spaced apart horizontal flanges includes one edge normal to the common longitudinal edge wherein each of the edges of the slanted flanges transverse to the common longitudinal edge are configured to intersect the common longitudinal edge at the intersection with the common longitudinal edge of the normal edge of one of the horizontal flanges.

14. A truss tie guide comprising:
a pair of spaced apart horizontal planar members for attaching to the horizontal portion of a support wall;
a vertical planar member transverse to the pair of horizontal planar members for attaching to the exterior vertical portion of a support wall and wherein the horizontal and vertical planar members are joined together at a common longitudinal edge;
a pair of transverse planar members disposed transverse to the horizontal and vertical planar members at the common longitudinal edge, integral with the vertical planar member, disposed between the spaced apart horizontal planar members, and spaced apart to define an opening slightly larger than the thickness of a cross member.

15. The truss tie guide of claim 14 wherein the vertical planar member has first and second flanges disposed entirely in the same plane as the vertical planar member and extending from the vertical planar member in a direction transverse to the pair of spaced apart horizontal planar member and the pair of transverse planar members.

16. The truss tie guide of claim 14 wherein each planar member has openings for receiving nails to fasten the vertical and horizontal planar members to the support wall and for fastening the pair of transverse planar members to the cross member.

17. The truss tie guide of claim 14 wherein the length of the vertical planar member is substantially equal to a specified spacing between two cross members.

18. The truss tie guide of claim 14 wherein the four planar members are formed from a unitary sheet.

19. The truss tie guide of claim 14 wherein the pair of transverse planar members have a substantially triangular shape.

20. A truss tie guide comprising:
a pair of spaced apart horizontal planar members for attaching to the horizontal portion of a top wall plate;
a vertical planar member transverse to the pair of spaced apart horizontal planar members for attaching to the exterior vertical portion of a top wall plate and wherein the horizontal and vertical planar members are joined together at a common longitudinal edge;
a pair of transverse planar members disposed transverse to the horizontal and vertical planar members at the common longitudinal edge, integral with the vertical planar member, disposed between the spaced apart horizontal planar members, and spaced apart to define an opening slightly larger than the thickness of a rafter.

* * * * *